UNITED STATES PATENT OFFICE.

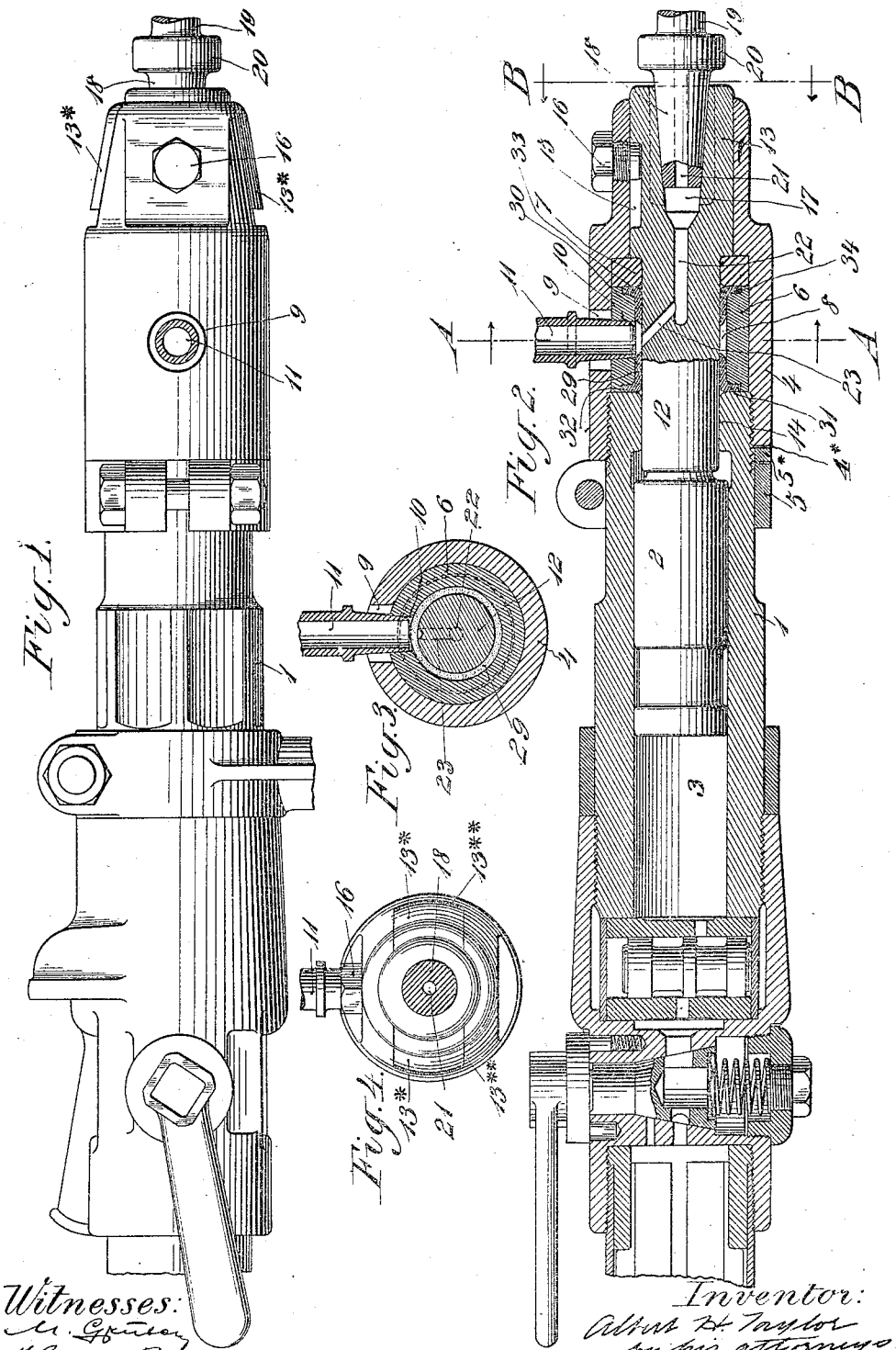

ALBERT H. TAYLOR, OF EASTON, PENNSYLVANIA, ASSIGNOR TO INGERSOLL-RAND COMPANY, OF NEW YORK, N. Y., A CORPORATION OF NEW JERSEY.

HAMMER-DRILL.

1,081,637.  Specification of Letters Patent.  Patented Dec. 16, 1913.

Application filed February 5, 1909. Serial No. 476,263.

*To all whom it may concern:*

Be it known that I, ALBERT H. TAYLOR, a citizen of the United States, and resident of Easton, in the county of Northampton and State of Pennsylvania, have invented a new and useful Improvement in Hammer-Drills, of which the following is a specification.

This invention relates to hammer drills and has for its object to provide a novel construction at the front end of the drill which will be particularly well adapted for feeding fluid under pressure to a hollow drill steel, fluid tight connections being provided for the pressure fluid feeding chamber.

In the accompanying drawings, Figure 1 represents a hammer drill in top plan with the invention applied thereto, Fig. 2 is a longitudinal central section through the same, certain of the portions being shown in side elevation, Fig. 3 is a transverse section taken in the plane of the line A—A of Fig. 2, and Fig. 4 is a transverse section taken in the plane of the line B—B of Fig. 2.

The drill cylinder is denoted by 1 and its hammer piston by 2, which piston is fitted to reciprocate in the chamber 3. The hollow front head 4 is rigidly secured to the outer end of the drill cylinder 1, as, for instance, by having a screw threaded engagement therewith. A clamping ring 5 embracing the cylinder 1 serves to lock the front head to the cylinder by providing the ring with a lug 5* which enters a recess 4* in the inner end of the front head 4. A tube 6 is interposed between the outer end of the cylinder 1 and a metal ring 7 seated in the front head 4, within which tube is formed a pressure fluid feeding chamber 8. A transverse hole 9 is formed in the front head 4 in alinement with a transverse hole 10 in the tube 6 so that communication may be established with the chamber 8 through a suitable pressure fluid supply pipe 11.

The shank 12 of the drill steel chuck 13 extends through the tube 6 and also through the reduced bore 14 at the outer end of the drill cylinder 1 into the chamber 3 in position to be struck by the hammer piston 2. The engagement of the ring 7 with the enlarged outer end of the chuck 13 serves as a stop for limiting the inward movement of the chuck. This chuck is permitted a limited longitudinal movement with respect to the front head 4 and held against unintentional removal therefrom, for instance, by providing the head of the chuck with a longitudinally elongated recess 15 into which the end of a screw 16 carried by the front head enters. The chuck is held against a rotary movement with respect to the front head by lugs or wings 13* which enter grooves 13** formed in the inner wall of the front head. This chuck is provided with a drill steel receiving socket 17, which socket is herein shown of flaring form so as to receive the tapered end 18 of the hollow drill steel 19. This drill steel is provided with an annular shoulder 20 for facilitating the removal of the drill steel from the chuck by the manipulation of a suitable tool inserted between the outer end of the chuck and the said shoulder.

The bore 21 of the hollow drill steel is at all times in open communication with the pressure fluid feeding chamber 8 by providing the chuck with a longitudinal duct 22 opening into the bottom of the socket 17 and a transverse duct 23 opening into the chamber 8.

Cup washers 29, 30, are provided for forming fluid tight packings for the drill steel chuck. The cup washer 29 has its circumferential flange 31 seated in an annular recess 32 in the inner end of the tube 6 and the circumferential flange 33 of the cup washer 30 is seated in an annular recess 34 in the outer end of the said tube.

It will be seen that by constructing the devices as here shown and described, it will be very easy to assemble and disassemble the parts for the purpose of renewing any of the same. Furthermore, it will be seen that a fluid tight feeding chamber is provided in communication with the hollow drill steel directly through the chuck without the interposition of other parts.

What I claim is:—

1. In combination, a cylinder, a hollow front head having a pressure fluid feeding chamber therein beyond the outer end of the cylinder, a chuck slidably mounted in the cylinder and front head having a drill receiving socket in open communication with said chamber and a hammer piston fitted to strike said chuck.

2. In combination, a cylinder, a hollow front head having a pressure fluid feeding chamber therein beyond the outer end of the cylinder, a chuck slidably mounted in the cylinder and front head, having a drill steel receiving socket in open communication with said chamber, separated fluid tight packings for the ends of said chamber and a hammer piston fitted to strike said chuck.

3. In combination, a cylinder, a hollow front head, a tube located within the front head beyond the outer end of the cylinder, said tube being provided with a pressure fluid feeding chamber, a chuck slidably mounted in the cylinder and front head having a drill steel receiving socket therein in open communication with the said chamber, separated fluid tight packings for the ends of the chamber interposed between the tube and chuck and a hammer piston fitted to strike said chuck.

4. In combination, a cylinder having a reduced bore at its outer end, a hammer piston, a hollow front head having a pressure fluid feeding chamber therein beyond the outer end of the cylinder, a chuck having a drill steel receiving socket in open communication with said chamber and provided with a shank extending through and slidably mounted in the said reduced bore and projecting into the cylinder in position to be struck by the hammer piston.

5. In combination, a cylinder having a reduced bore at its outer end, a hammer piston, a hollow front head having a pressure fluid feeding chamber therein beyond the outer end of the cylinder, a chuck having a drill steel receiving socket in open communication with said chamber and provided with a shank extending through and slidably mounted in the said reduced bore and projecting into the cylinder in position to be struck by the hammer piston, and separated fluid tight packings for the ends of said pressure fluid feeding chamber.

6. In combination, a cylinder having a reduced bore at its outer end, a hammer piston, a hollow front head, a tube located therein beyond the outer end of said cylinder, said tube having a pressure fluid feeding chamber therein and a chuck having a drill steel receiving socket in open communication with said chamber and provided with a shank extending through and slidably mounted in the said reduced bore and projecting into the cylinder in position to be struck by the hammer piston.

7. In combination, a cylinder having a reduced bore at its outer end, a hammer piston, a hollow front head, a tube located therein beyond the outer end of said cylinder, said tube having a pressure fluid feeding chamber therein and a chuck having a drill steel receiving socket in open communication with said chamber and provided with a shank extending through and slidably mounted in the said reduced bore and projecting into the cylinder in position to be struck by the hammer piston, and cup washers at the ends of the said tube interposed between the tube and the shank of the chuck to form fluid tight packings for said pressure fluid feeding chamber.

In testimony, that I claim the foregoing as my invention, I have signed my name in presence of two witnesses, this first day of February, 1909.

ALBERT H. TAYLOR.

Witnesses:
CHAS. BRUNNER,
RUSSELL H. WILHELM,

---

Copies of this patent may be obtained for five cents each, by addressing the "Commissioner of Patents, Washington, D. C."